United States Patent Office 3,544,376
Patented Dec. 1, 1970

3,544,376
METHOD AND APPARATUS FOR MONITORING FUEL CELL FEED
James E. Connor, Jr., Wynnewood, Alfred F. D'Alessandro, Havertown, and Harold Shalit, Drexel Hill, Pa., assignors to Atlantic Richfield Company, Philadelphia, Pa., a corporation of Pennsylvania
Filed Aug. 26, 1966, Ser. No. 575,301
Int. Cl. H01m 27/00
U.S. Cl. 136—86
8 Claims

ABSTRACT OF THE DISCLOSURE

This invention relates to monitoring the methane concentration in a fuel cell effluent and adjusting the rate of feed to the fuel cell responsive to said monitoring.

MEANS FOR OPERATING FUEL CELLS

This invention relates to in situ hydrogen generating fuel cells, and has for an object the provision of reliable means for maintaining a predetermined efficiency of the conversion of the carbonaceous fuel to electric current at different levels of current drawn from such cells.

In steam reforming carbonaceous fuels, such as hydrocarbons for example, the theoretical steam-to-carbon molar ratio is 2, i.e., at least 2 moles of steam are theoreticaly required per mole of carbon in the fuel. Thus, for ethane ($C_2H_6$), 4 moles of steam are theoretically required to convert one mole of ethane to hydrogen and carbon dioxide. In the case of octane ($C_8H_{18}$), sixteen moles of steam per mole of octane are theoretically required.

However, the extent of reaction, or conversion, of the fuel to hydrogen is limited by equilibrium considerations. To cite an example, when one mole of hexane ($C_6H_{14}$) and a small excess of steam (13.5 moles) is reacted to completion over a reforming catalyst at a temperature of the order of 455° C., a gaseous mixture is obtained whose composition in mole percent is 22.6% hydrogen, 18.9% methane, 11.6% carbon dioxide, 0.6% carbon monoxide, and 46.2% water. As the ratio of steam to hexane is increased, the equilibrium concentration of hydrogen in the reformed product will increase. In another example, where propane was steam reformed at 450° C., the amount of hydrogen produced per mole of propane feed at different steam-to-carbon ratios was found to be independent of space velocity, indicating equilibrium control, and further indicating that the extent of hydrogen formation could not be increased by changing the reforming catalyst.

In order to obtain 80% of the theoretical hydrogen from propane, a steam-to-carbon ratio of about 9.5 or nearly 5 times theoretical is required. To obtain 80% conversion of the theoretical hydrogen from methane, a steam-to-carbon ratio of about 20, or 10 times theoretical is required. It is apparent, therefore, that in order to achieve complete or nearly complete conversion of the fuel to hydrogen, extremely large quantities of steam must be used.

However, it has been found that in fuel cells of the in situ hydrogen generating variety such as described in U.S. Government Report No. AD 613,031, large excesses of steam in the feed supplied to the cell are highly undesirable. Generaly speaking, in such in situ hydrogen generating fuel cells, a steam-carbonaceous fuel admixture is passed into a reforming zone containing a suitable reforming catalyst to cause a reforming reaction generating hydrogen. At least one wall of such reforming zone includes a suitable hydrogen transfer means, such as hydrogen permeable metallic membrane (of palladium for example), through which the generated hydrogen is passed into the electrolyte for electrochemical reaction in the cell. The remaining products of the reforming reaction, including the carbon oxides, methane, and unreacted starting materials, if any, are then passed out of the reforming zone and into the surrounding environment. Use of excessive amounts of steam in such cells seriously lowers the hydrogen partial pressure at the anode, thus lowering its equilibrium electrode solution potential, and consequently the cell voltage which can be obtained. Further, the heat of vaporization required for the large quantities of steam places an additional burden on the thermal efficiency of the cell.

It has been found that upon feeding a carbonaceous fuel-steam mixture to an in situ hydrogen generating fuel cell at near stoichiometric steam-to-carbon ratios, a substantial part of the fuel can be consumed to produce electrical current if the feed rate is matched to the current requirement of the cell. Stated otherwise, electric current can be produced which is equivalent to a major portion of the Faradaic current obtainable from the particular fuel used. While drawing current from the cell, hydrogen is consumed in the electochemical reaction thus lowering the hydrogen partial pressure at the electrolyte side of the hydrogen permeable membrane which forms at least one wall of the reforming anode. By virtue of the removal of hydrogen from the reforming zone, a shift in the steam reforming equilibrium is achieved resulting in virtually complete conversion of the fuel to hydrogen.

For example, a mixture of a carbonaceous fuel (octane) and steam was metered into the reforming zone of an in situ hydrogen generating fuel cell at a steam-to-carbon molar ratio of 2.5 (20 moles of steam per mole of octane). The reforming zone contained a steam reforming catalyst and included a hydrogen permeable membrane through which the hydrogen generated during the reforming reaction could be passed to the electrolyte for electrochemical reaction in the cell. The octane was fed to the anode at a steady rate of 1.075 millimoles of octane per hour, which, at complete conversion to hydrogen, could produce hydrogen at a rate of 26.86 millimoles per hole, equivalent to a current of 1,440 milliamperes. A current of 1,150 milliamperes was actually drawn from the cell at good voltage and current density levels. This amounted to a current efficiency of 80%, indicating a minimum conversion of octane to hydrogen at 80%.

In a similar fuel cell containing a membrane of pure palladium, steam and propane were metered into the reforming zone at a steam-to-carbon ratio of about 2.4. The propane was fed at a steady rate of 11.75 millimoles of propane per hour which, at complete conversion to hydrogen, could produce hydrogen at a rate of 117.5 millimoles per hour, equivalent to a current of 6,300 milliamperes. A current of 4,670 milliamperes was actually drawn from the cell at good voltage and current density levels, amounting to a current efficiency of 74%, which is also the minimum conversion of propane to hydrogen.

While steam-to-carbon ratios equal to or approaching the stoichiometric value can be employed in achieving a high degree of conversion of the carbonaceous fuel to hydrogen, and therefore to electric current, there nevertheless exists a problem of maintaining the fuel utilization efficiency at a reasonable value when the level of current being drawn from the fuel cell is varied. Since during normal operation of any fuel cell, it may be desired to vary the amount of current drawn, it would be necessary to adjust continuously the feed rate of the steam-fuel mixture to the reforming zone to maintain any desired fuel utilization efficiency as the amount of current being drawn from the cell is varied.

Thus, for example, if in the previous case in which a steam-propane mixture (steam-to-carbon ratio of 2.4) was fed at a rate of 11.75 millimoles of propane per hour into a fuel cell from which a current of 4,670 milliamperes is drawn, the fuel utilization efficiency would be 74%. If the current drawn from the cell is adjusted to a value of 2,365 milliamperes and the rate at which the steam-propane mixture is fed into the cell is maintained constant, the fuel utilization efficiency drops to a value of 37%. Obviously, such inefficient utilization of the fuel is undesirable and often could not be tolerated in commercial applications requiring efficient fuel utilization.

It is therefore a primary object of the present invention to provide means for maintaining a predetermined fuel utilization efficiency at defferent levels of electric current drawn from the cell.

A further object of the present invention is the provision of a process for maintaining a predetermined fuel utilization efficiency at different levels of electric current drawn from an in situ hydrogen generating fuel cell.

Yet another object of the invention is the provision of apparatus for maintaining a predetermined fuel utilization efficiency at different levels of electric current drawn from an in situ hydrogen generating fuel cell.

In accordance with the present invention, different levels of electric current can be drawn from an in situ hydrogen generator fuel cell, and the fuel utilization efficiency can be maintained at or above a predetermined value. This may be attained in accordance with one embodiment of the invention by the process for operating a fuel cell including an anode and a cathode disposed in an electrolyte, a reforming zone including a reforming catalyst for steam reforming of a carbonaceous fuel to produce hydrogen, said anode including a hydrogen permeable metallic membrane adjacent said zone for transfer of hydrogen generated therein into said electrolyte during operation of said cell; said process comprising: introducing into said zone at a predetermined feed rate a steam-carbonaceous fuel admixture at a ratio of at least about 2 moles of steam per mole of carbon in said fuel, reacting said admixture over said catlyst to form a gaseous mixture including hydrogen and methane, passing said hydrogen through said membrane and into said electrolyte for electrochemical reaction therein to produce electric current, passing the remainder of said gaseous mixture including methane from said zone, the concentration of methane in said gaseous mixture exiting said zone being representative of the efficiency of conversion of said fuel to electric current, and adjusting the steam-fuel feed rate to said zone as the level of current drawn from the cell is varied to maintain the concentration of methane in said gaseous mixture exiting said zone below a predetermined value.

In accordance with a further embodiment of the invention, there is provided the combination comprising a fuel cell including an electrolyte chamber and an anode and a cathode disposed for contact with an electrolyte when said chamber is filled, a reforming zone in said cell including a reforming catalyst adjacent said anode adapted to produce a gaseous mixture including hydrogen and methane from steam and carbonaceous fuel, said anode including a hydrogen permeable metallic membrane for transfer of hydrogen produced in said zone into said electrolyte chamber, means for passing the gaseous mixture including methane and substantially free of hydrogen from said zone, means for monitoring the concentration of methane in said gaseous mixture exiting said zone, and means for adjusting the rate of steam-fuel feed into said zone to maintain the concentration of methane in said gaseous mixture exiting said zone below a predetermined value as the level of electric current drawn from the cell is varied.

In accordance with the present invention, a steam-carbonaceous fuel admixture characterized by a ratio of at least about 2 moles of steam per mole of carbon in the fuel is passed into the reforming zone of the fuel cell. Generally, hydrocarbon fuels should be used, and low steam-to-carbon ratios should be employed so as not to reduce the hydrogen partial pressure in the anode, and thereby lower its equilibrium electrode solution potential, and consequently the cell voltage attained. Further, as noted above, the heat of vaporization required for large quantities of water fed into the reforming zone at high steam-to-carbon ratios places an additional burden on the thermal efficiency of the cell. In this connection, we have found that ratios of less than about 5 moles of steam per mole of carbon in the carbonaceous fuel should be employed, and that a ratio of 3 or less is preferred. Further, we have discovered that good results may be obtained when the steam-to-carbon molar ratio ranges from about 2.1 to about 2.7.

The rate at which the steam-fuel mixture is fed into the reforming zone can vary within wide limits and will depend upon the size of the reforming zone in the cell, the rate at which current is drawn from the cell, the temperature of reforming and the pressure at which reforming occurs. From a practical standpoint, however, the upper limit (for any given cell at any given set of operating conditions) of the rate or velocity of steam-fuel introduction to the reforming zone will be the value at which conversion of the fuel falls below 100%. As used in this connection, the term "conversion" refers to the transformation of the fuel originally fed to the reforming zone into hydrogen, carbon oxides, and the lower molecular weight hydrocarbons such as methane. Thus, conversion of the fuel will fall below 100% where unreacted fuel appears in the effluent from the reforming zone. To cite an example, if an octane-steam mixture is fed to the reforming zone, essentially 100% conversion would be attained where the exit gases contain hydrogen, methane, carbon dioxide, carbon monoxide, and water, but are free of octane, except perhaps in a trace amount. Of course, in the case of using methane as the fuel, conversion will always be below 100%, the concentration of methane in the exiting gases being representative of the fuel utilization efficiency.

The carbonaceous fuels useful in the practice of the invention include hydrocarbons, such as for example, methane, ethane, propane, butane, pentane, hexane, heptane, octane, etc.; and mixtures thereof; petroleum fractions; aliphatic alcohols, including ethanol, propanol, butanol, etc.; liquified petroleum gases; and JP-fuels. Other carbonaceous fuels suitable for use in the practice of the invention will occur to those skilled in the art. Generally, aliphatic and naphthenic compounds are preferred because of their greater hydrogen content.

The steam used in the practice of the invention can be fed to the reforming zone at any suitable temperature, preferably at a temperature which corresponds to the temperature attained in the reforming zone of the cell during cell operation. Preferably, the steam is admixed with the carbonaceous fuel to provide the appropriate admixture at some point prior to the introduction of the steam and fuel to the reforming zone of the cell.

The temperature at which the reforming reaction is conducted within the fuel cell can vary within wide limits and preferably ranges from about 250° C. to about 550° C. At temperatures below about 250° C. it has been found that cell operation is not efficient. At temperatures above about 550° C. corrosion problems are enhanced, and the use of more expensive construction materials is required, thus making fuel cell operation less attractive. We have found that the optimum reforming temperature to be within the range of from about 400° C. to about 500° C. and preferably about 450° C.

The pressure at which the reforming reaction can be conducted in accordance with the process of the invention can range up to about 10 atmospheres. Operation of the cell at higher pressures, but below about 10 atmospheres, generally achieves the production of hydrogen at higher partial pressures at the fuel anode. Of course, ease of operation dictates that the reforming reaction be conducted at atmospheric pressure thus avoiding any difficulties which might be encountered when operating the cell at substantially higher pressures.

As noted above, the reforming zone of the fuel cell will contain a reforming catalyst which permits a more rapid production of hydrogen under the conditions of fuel cell operation. The preferred catalysts which can be used in accordance with the invention include particles of nickel coated refractory containing from about 4% to about 70% by weight of nickel, and from about 0.5% to about 20% of an alkali or alkaline earth metal oxide, hydroxide or carbonate, based upon the weight of the metal. Examples of suitable refractories are silica; kieselguhr; zirconia; alumina; natural clays; silica-alumina; metallic carbides, including Carborundum; titania; and molecular sieves.

The alkali or alkaline earth metal oxides, hydroxides and carbonates included in the aforesaid catalysts include the oxides, hydroxides and carbonates of metals such as sodium, potassium, lithium, rubidium, cesium, calcium, strontium, magnesium, and barium. Examples of specific compounds falling in this class are sodium oxide, potassium hydroxide, lithium carbonate, calcium oxide, strontium hydroxide, and magnesium carbonate.

In addition, the catalyst useful in the practice of the invention can be a nickel coated alkaline earth oxide, (e.g., calcium oxide, magnesium oxide, barium oxide) having a nickel content of from about 4% to about 70% by weight.

Generally speaking, any electrolyte in which hydrogen can be oxidized can be used in the practice of the present invention. Preferably, molten caustic electrolytes, such as molten alkali hydroxides, including sodium hydroxide and potassium hydroxide, and mixtures thereof can be used. Other suitable electrolytes will readily occur to those skilled in the art.

A critical feature of the present invention is the use of a hydrogen permeable membrane as at least a portion of at least one wall of the reforming zone in which hydrogen is generated from the steam-carbonaceous fuel mixture. Such a membrane can comprise any hydrogen permeable metallic membrane which is compatible with the surrounding environment, i.e., possesses sufficient resistance to the effects of the electrolyte and which will maintain its physical integrity at the temperatures at which reforming occurs. Examples of such membranes include palladium or hydrogen permeable palladium alloys such as a silver-palladium alloy containing 25% silver.

As noted previously, the present invention takes advantage of the discovery that the concentration of methane (calculated on a dry basis) in the effluent gases exiting the reforming zone is representative of the utilization efficiency of the carbonaceous fuel which is fed to the cell. As used herein, fuel utilization efficiency is defined as the ratio of the electric current actually drawn from the cell to the value of electric current which is equivalent to the theoretical maximum of electricity obtainable as calculated from the Faradaic equivalence of fuel charged to the cell. In maintaining a predetermined fuel utilization efficiency in accordance with the invention, as the amount of current from the cell is varied, any suitable means for monitoring the methane concentration in the gases exiting the reforming zone may be employed, such for example as a conventional gas analyzer using the principle of absorption of infrared radiation, or a gas chromatography, which means is capable of generating a signal proportional to the percentage content of methane in the exit gas. In this connection any of the well known detector-recorder-controller systems may be employed which can monitor the methane concentration, plot the values of methane concentration in the exit gas over the period of continued fuel cell operation if desired, and further control the rate at which the steam-fuel admixture is passed to the reforming zone. Alternatively, the concentration of methane in the gaseous effluent from the fuel cell can be detected or monitored by separating the water and $CO_2$ from the gas to leave a substantially two-component mixture including hydrogen and methane. This two-component mixture can then easily be monitored for methane concentration by any suitable chemical or physical technique as, for instance, thermal conductivity or heat of combustion measurements, or the measurement of any appropriate physical property which is representative of the gas composition.

For a better understanding of the invention and a more detailed description of other useful features, reference is to be had to the following description taken in conjunction with the accompanying drawings in which.

Figure 1:
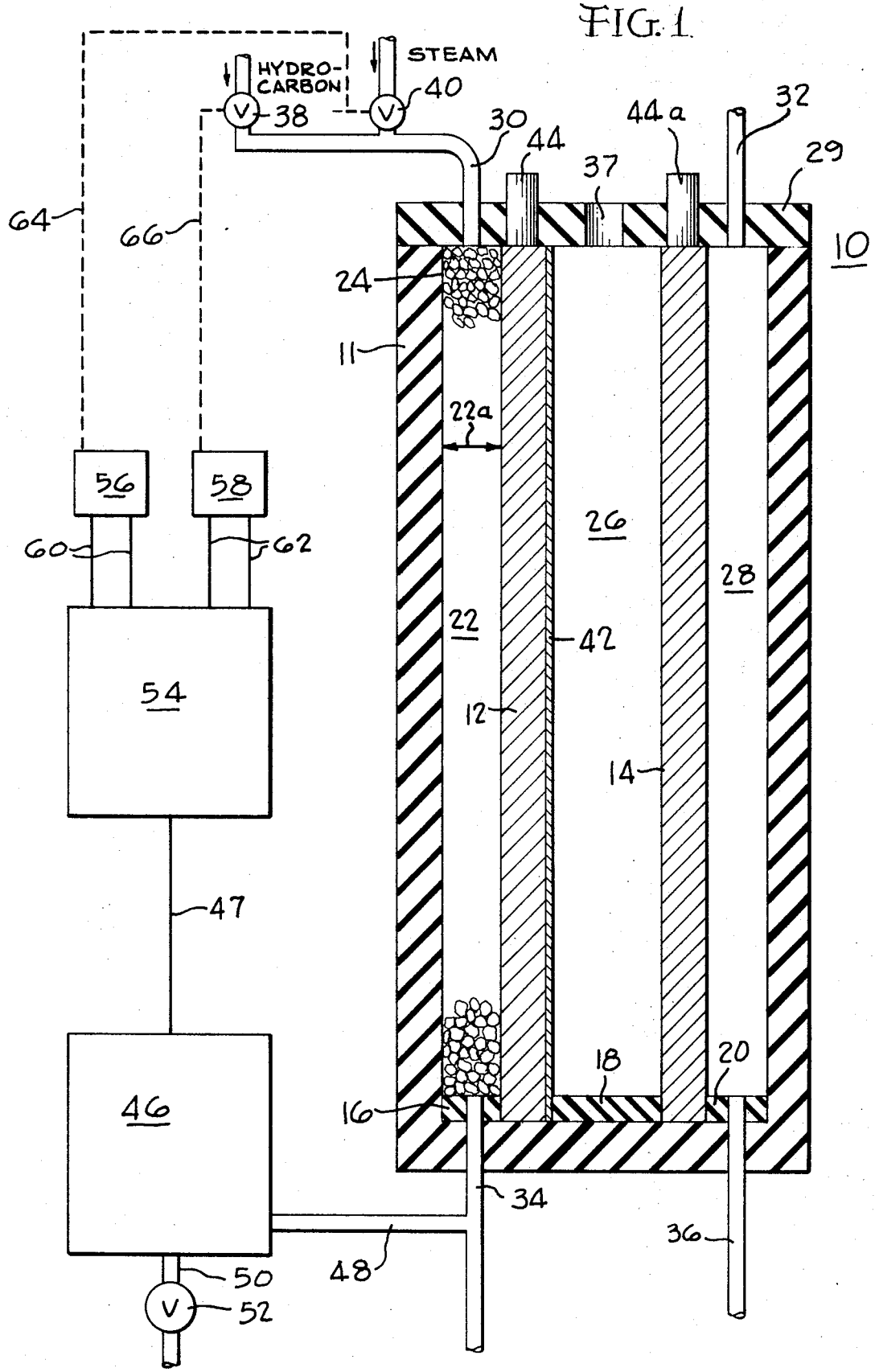
FIG. 1 is a cross-sectional view of a fuel cell assembly illustrating one embodiment of the present invention.

Referring more particularly to FIG. 1, the fuel cell assembly 10 includes a fuel cell having an outer casing 11 of non-conductive impermeable material, and a pair of electrodes, an anode 12 and a cathode 14 which are maintained in the casing by spacers 16, 18 and 20 to provide a reforming zone 22 containing a reforming catalyst 24 dispersed throughout the zone 22, an electrolyte space 26, and an oxidant space 28, respectively. The catalyst 24 can comprise particles of a nickel coated refractory containing from about 0.5% to about 20% by weight of an alkali or alkaline earth metal oxide, hydroxide, or carbonate (such as, for instance, an alumina catalyst containing about 33% of nickel and including sodium hydroxide in an amount of about 5.75% expressed as sodium metal) or a nickel coated alkaline oxide, such as nickel coated magnesia, containing 25% nickel. The size of the catalyst particles will vary depending upon the width 22a of the reforming zone 22. Preferably, the particles should have diameters ranging from one-fifth to one-tenth of the width of the zone. The cell roof, or cover, 29 is provided with suitable conduits 30 and 32 to supply the fuel-steam admixture and oxidant respectively to the reforming zone 22 and to the oxidant space 28. Outlet pipes 34 and 36 are provided for the venting of the gases. The cover 29 is provided with a suitable port 37 for venting the water formed during cell operation from the electrolyte contained in the space 26.

During cell operation the electrolyte space is filled with a suitable electrolyte, such as a molten alkali hydroxide, e.g., a mixture of sodium hydroxide and potassium hydroxide, and a fuel feed comprising an admixture of carbonaceous fuel and steam is fed to the reforming zone through conduit 30. The steam-carbonaceous fuel ratio and rate supplied to conduit 30 can be controlled by suitable adjustment of valves 38 and 40 which afford the control of the hydrocarbon and steam respectively. In the zone 22 the steam reacts with the carbonaceous fuel over the catalyst 24 to produce a gaseous mixture including hydrogen and methane. The anode 12 comprises a microporous substrate such, for example, as microporous carbon having on its face exposed to the electrolyte a nonporous hydrogen permeable metallic membrane 42 as of palladium. Although the thickness of the membrane 42 can vary to a large extent, thin membranes having thicknesses of the order 0.0001 inch or less are preferred. It is, of course, possible to employ thicker hydrogen permeable metallic membranes which are self-supporting. In such instances the porous carbon support or substrate 12 would be unnecessary.

Prior to the start-up of the cell, the electrolyte space 26 is filled with a suitable electrolyte as mentioned above, and the cell heated to the operating temperature which can be of the order of about 450° C. An admixture of a carbonaceous fuel (such as propane gas) and steam is then introduced into the reforming zone 22 via pipe 30, and a suitable oxidant such as air is introduced to the oxidant space 28 via pipe 32. The proportion of the fuel to steam, and the rate at which the admixture is introduced into the zone 22 is regulated by suitable manipulation of the control valves 38 and 40. Upon entering the reforming zone 22 and contacting the catalyst 24 the fuel and steam react to produce a gaseous mixture including hydrogen and methane. When current is drawn from the cell through the conduits 44 and 44a, the hydrogen produced is caused to pass through the membrane 42 and into the electrolyte in the electrolyte space 26 for electrochemical reaction. For example, at a feed ratio of 6.9 moles of steam per mole of propane (steam-to-carbon ratio 2.3), 4.4 ml. (STP) of propane per minute were fed to the reforming zone maintained at 450° C. and about one atmosphere. Four and eight-tenths amperes of current were drawn from the cell at a voltage of 0.76 volt. Analysis of the exit gases revealed no propane to be present therein, indicating that conversion of the fuel was 100%.

In the embodiment shown, a suitable means 46 for monitoring the methane concentration in the exit gas, such as a conventional gas analyzer utilizing the principle of absorption of infrared radiation, and including suitable means for separating water (steam) from the effluent, is supplied with a sample of the exiting gases via pipe 48 which is connected to the outlet pipe 34. The monitoring device, or analyzer, 46 generates a signal proportional to the percentage content of methane in the exit gas (on a dry basis), which signal is transmitted via line 47 to the control unit 54 which provides automatic control over valves 38 and 40. Signals from the control unit 54 are transmitted through cables 60 and 62 to valve actuators 56 and 58 respectively which in turn position the valves 38 and 40 by means of linkages 64 and 66. The monitoring unit 46 is also provided with a suitable outlet pipe 50 permitting the sample of exit gas passed into the device 46 via pipe 48 to be vented to the atmosphere after analysis has been achieved. Valve 52 can be used to regulate the flow of the sample material through the analyzing device 46.

Figure 2:
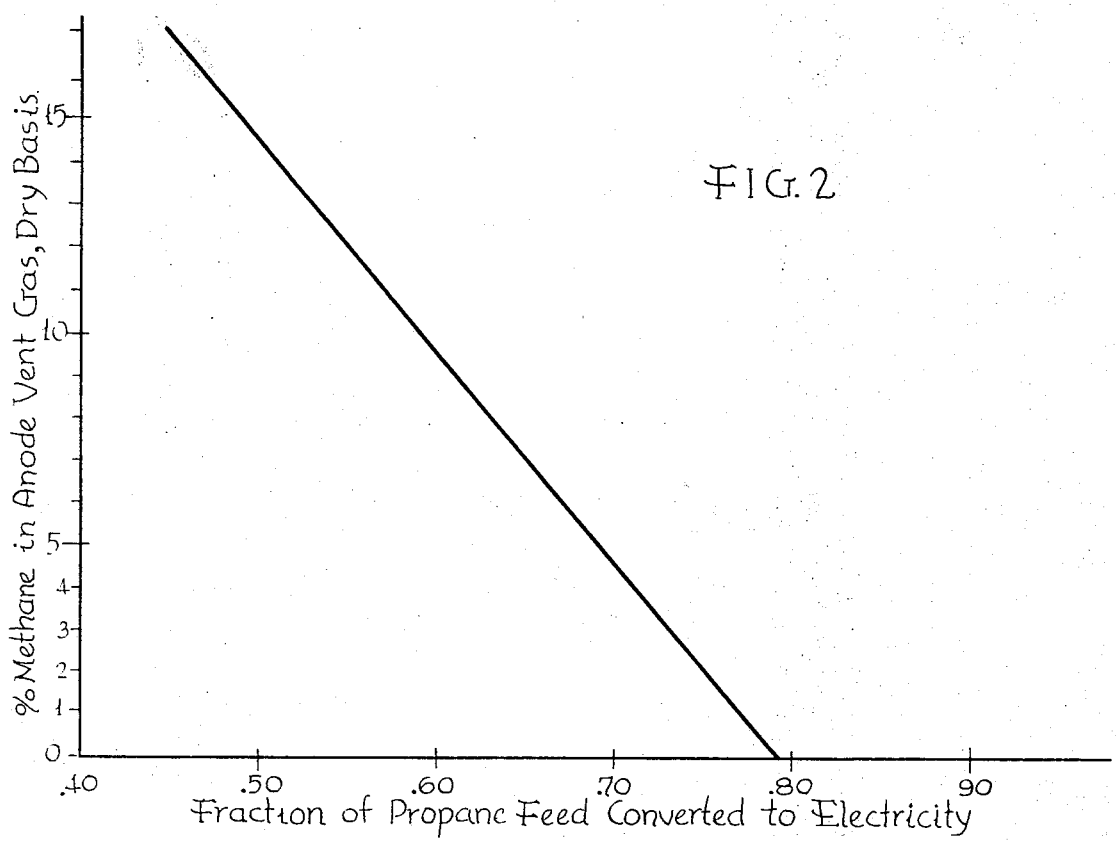
FIG. 2 is a chart useful in understanding the invention.

A still better understanding of the practice of the invention may be achieved by referring to FIG. 2 which comprises a calibration chart illustrating the relationship of the concentration of methane in the exiting gases of a fuel cell, calculated on a dry basis, and the fraction of propane feed converted to electricity in the cell. The calibration chart illustrated as FIG. 2 was the result of several runs made during which a propane-steam mixture was fed to a fuel cell of the type described at a steam-to-carbon ratio of 2.3. From FIG. 2 it will be apparent that in the event it is desired to maintain an efficiency of conversion of the propane to electric current at a value of above 60% the methane concentration in the exiting gases must be maintained below a value of about 10%. Should it be desired to operate the cell at a fuel utilization efficiency of at least 70%, the methane concentration in the exiting gases should be maintained below about 4.2%.

Figure 3:
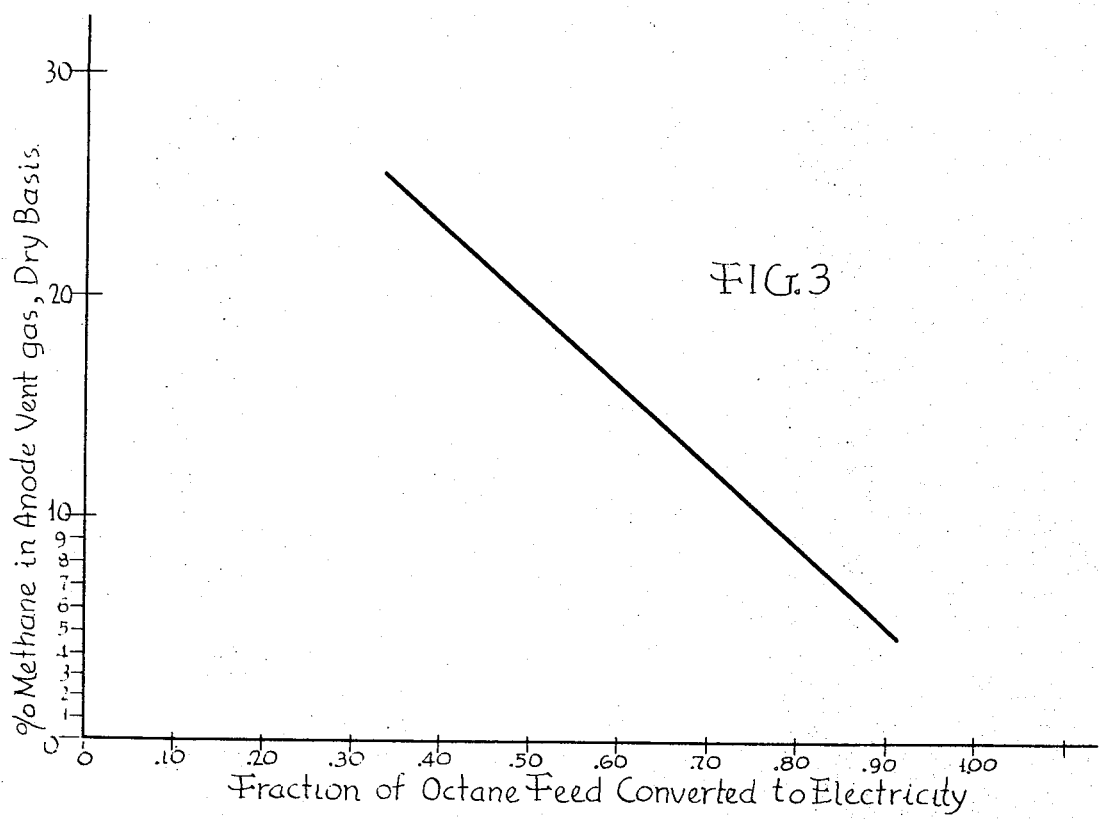
FIG. 3 is another chart useful in understanding the present invention.

FIG. 3 comprises a calibration chart which illustrates the relationship between the percent of methane in the gases exiting the fuel cell reforming zone and the fraction of octane feed converted to electricity when steam-to-carbon ratios of about 2.5 are employed. FIG. 3 shows that in order to maintain the fuel utilization efficiency of the octane at a value of about 70%, the concentration of methane in the exiting gases must be maintained below a value of about 13%, on a dry basis. Where fuel utilization efficiencies of 80% are to be realized, the concentration of methane in the exiting gas should not be above about 9%.

It will thus be seen that in FIG. 1, the concentration of methane in the exiting gases can continuously be monitored by device 46 such that when the amount of current drawn from the cell via conduits 44 and 44a is varied, the control unit 54, which receives a signal proportional to the concentration of methane in the exiting gases, can adjust the rate of the steam-fuel feed by adjusting the valves 38 and 40 via valve actuators 56 and 58 and linkages 64 and 66. In this manner, the adjustment of the fuel feed rate to the reforming zone is made automatically and is in response to the concentration of methane in the exiting gases. It will be appreciated, of course, that analysis of the exiting gases can be made in any manner, and the adjustment of the fuel and steam feed rates to the reforming zone can be made manually. Automatic control will generally be preferred since it will be more rapid and thus afford a greater conservation of fuel.

If an automatic system is employed, control device 54 can be preset to maintain the fuel supply to the reforming zone of the cell at a rate which will afford a fuel utilization efficiency falling within a predetermined range. To cite an example, if octane is to be employed as a carbonaceous fuel, and a fuel utilization efficiency ranging from about 70% to about 80% is to be maintained, the control device 54 can be calibrated to cause valve actuators 56 and 58 to reduce the feed rate of the steam octane admixture to the reforming zone where the concentration of methane in the exiting gases rises above 13%, and to increase the feed rate where the concentration of methane in the exiting gas falls below 9%. In this manner, continuous fuel cell operation at fuel utilization efficiencies ranging from 70% to 80% may be automatically maintained.

While the present invention has been described in considerable detail with respect to the control of the fuel-steam admixture to a single fuel cell, it will be appreciated that the invention finds equal applicability, and is in fact particularly intended for use in connection with a battery of many fuel cells arranged in series-parallel relationship. In this respect, it will be appreciated that the present invention affords the regulation of the steam-carbonaceous fuel feed supply to such a plurality of fuel cells, thus permitting continuous and reliable operation of in situ hydrogen generating fuel cells at fuel utilization efficiencies which can be maintained at predetermined values throughout changes in the level of current drawn from the battery of cells.

What is claimed is:

1. In an electric current generating fuel cell including an anode and a cathode disposed in an electrolyte, a reforming zone including a reforming catalyst for steam reforming of a carbonaceous fuel to produce hydrogen, said anode including a hydrogen permeable metallic membrane adjacent said zone for transfer of hydrogen generated therein into said electrolyte during operation of said cell, the process for maintaining the efficiency of conversion of said fuel into electric current above a predetermined minimum as the level of electric current drawn from said cell is varied, which comprises:

reforming said carbonaceous fuel at a temperature between 250° C. and 550° C. and at a pressure of less than about 10 atmospheres,
introducing into said zone at a predetermined feed rate a steam-carbonaceous fuel admixture at a ratio of at least about 2 moles and less than about 5 moles of steam per mole carbon in said fuel,
reacting said admixture over said catalyst to form a gaseous mixture including hydrogen and methane,
passing said hydrogen through said membrane and into said electrolyte for electrochemical reaction therein to produce electric current,
equilibrium reactions in said reforming zone being shifted toward hydrogen production as hydrogen is continuously passed through said membrane due to the difference of the partial pressure of hydrogen on the respective sides of said membrane, passing the remainder of said gaseous mixture including methane from said zone, the concentration of methane in said gaseous mixture exiting said zone being representative of the efficiency of conversion of said fuel to electric current, monitoring said gaseous mixture exiting from said zone to determine the concentration of methane therein, and adjusting the fuel feed rate response to said monitoring, while maintaining a constant steam-fuel ratio, to said zone as the level of current drawn from the cell is varied to maintain the concentration of methane in said gaseous mixture exiting said zone below a predetermined value.

2. The process of claim 1 in which the ratio of the steam-fuel feed into said zone is below about 3 moles of steam per mole of carbon in said fuel.

3. The process of claim 1 in which the ratio of the steam-fuel feed into said zone ranges from about 2.1 to about 2.7 moles of steam per mole of carbon in said fuel.

4. The process of claim 1 in which the gaseous mixture exiting said zone is substantially free of said carbonaceous fuel.

5. The process of claim 1 in which the reforming reaction is conducted at a temperature of from about 400° C. to about 500° C.

6. The process of claim 1 in which the reforming reaction is conducted at substantially atmospheric pressure.

7. The combination comprising a fuel cell including an electrolyte chamber and an anode and a cathode disposed for contact with an electrolyte when said chamber is filled, means for heating said fuel cell to the operating temperature of between 250° C. and 550° C.

a reforming zone in said cell including a reforming catalyst adjacent said anode adapted to produce a gaseous mixture including hydrogen and methane, from steam and carbonaceous fuel, said anode including a hydrogen permeable metallic membrane for transfer of hydrogen produced in said zone into said electrolyte chamber, means for passing the gaseous mixture, including methane and substantially free of hydrogen from said zone, means for monitoring the concentration of methane in said gaseous mixture exiting said zone, means for adjusting the rate of fuel feed at constant steam-fuel ratio into said zone to maintain the concentration of methane in said gaseous mixture exiting said zone below a predetermined value as the level of electric current drawn from the cell is varied, and signal means whereby the rate of said fuel feed into said zone is responsive to the concentration of methane in said gaseous mixture exiting said zone as determined by said monitoring means.

8. The combination of claim 7 in which the reforming catalyst comprises nickel.

References Cited
UNITED STATES PATENTS

| | | | |
|---|---|---|---|
| 1,834,115 | 12/1931 | Williams | 23—213 |
| 3,141,796 | 7/1964 | Fay et al. | 136—86 C |
| 3,251,652 | 5/1966 | Pfefferle | 23—213 |
| 3,259,524 | 7/1966 | Fay et al. | 136—86 |

WINSTON A. DOUGLAS, Primary Examiner

H. A. FEELEY, Assistant Examiner